(12) United States Patent
Cui et al.

(10) Patent No.: US 12,198,097 B2
(45) Date of Patent: *Jan. 14, 2025

(54) SYSTEMS AND METHODS FOR SIMULATION OF PACKAGE CONFIGURATIONS FOR GENERATING COST OPTIMIZED CONFIGURATIONS

(71) Applicant: COUPANG CORP., Seoul (KR)

(72) Inventors: Xiaohua Cui, Shanghai (CN); Zhijun Xu, Shanghai (CN); Rubin Zhao, Shanghai (CN); Jianmin Duan, Shanghai (CN)

(73) Assignee: COUPANG CORP., Seoul (KR)

( * ) Notice: Subject to any disclaimer, the term of this patent is extended or adjusted under 35 U.S.C. 154(b) by 100 days.

This patent is subject to a terminal disclaimer.

(21) Appl. No.: 17/653,423

(22) Filed: Mar. 3, 2022

(65) Prior Publication Data
US 2022/0188759 A1 Jun. 16, 2022

Related U.S. Application Data

(63) Continuation of application No. 16/579,432, filed on Sep. 23, 2019, now Pat. No. 11,301,804.

(51) Int. Cl.
*G06Q 10/08* (2024.01)
*G06Q 10/04* (2023.01)
(Continued)

(52) U.S. Cl.
CPC .......... *G06Q 10/087* (2013.01); *G06Q 10/04* (2013.01); *G06Q 10/0833* (2013.01); *G06Q 10/0838* (2013.01)

(58) Field of Classification Search
None
See application file for complete search history.

(56) References Cited

U.S. PATENT DOCUMENTS 4,972,494 A * 11/1990 White .................. B65B 19/28
209/535
6,333,979 B1 12/2001 Bondi et al.
(Continued)

FOREIGN PATENT DOCUMENTS

CN 108780529 A 11/2018
CN 110088785 A 8/2019
(Continued)

OTHER PUBLICATIONS

Notice of Final Rejection in counterpart Korean Application No. 10-2021-0088013 dated Jan. 18, 2023 (6 pages).
(Continued)

*Primary Examiner* — Fateh M Obaid
(74) *Attorney, Agent, or Firm* — FINNEGAN, HENDERSON, FARABOW, GARRETT & DUNNER LLP

(57) ABSTRACT

The package configuration optimization system includes at least one non-transitory storage medium comprising instructions and at least one processor executing the instructions for performing operations. The operations may include receiving historical order data associated with a fulfillment center, the order data including at least one of items ordered, package information, shipping costs, or fill rate, generating a forecast for order data based on the historical order data and performance data associated with the fulfillment center, the forecast comprising a plurality of dummy orders, receiving preferences for packaging cost reduction, determining a current packaging configuration associated with the fulfillment center, optimizing the current packaging configuration to generate at least one new packaging configuration using the received preferences and the generated forecast, and sending the at least one new packaging configuration to a remote system.

20 Claims, 9 Drawing Sheets

(51) Int. Cl.
*G06Q 10/083* (2023.01)
*G06Q 10/0833* (2023.01)
*G06Q 10/087* (2023.01)

(56) References Cited

U.S. PATENT DOCUMENTS

| | | | |
|---|---|---|---|
| 9,733,629 B2* | 8/2017 | Lu | G05B 13/048 |
| 10,467,507 B1* | 11/2019 | Hao | G06F 18/2415 |
| 2002/0111877 A1 | 8/2002 | Nelson | |
| 2009/0276771 A1 | 11/2009 | Nickolov et al. | |
| 2014/0128996 A1* | 5/2014 | Sayyarrodsari | G05B 19/41885 700/29 |
| 2015/0120596 A1* | 4/2015 | Fadell | G08B 27/003 705/330 |
| 2015/0277397 A1 | 10/2015 | Hyde et al. | |
| 2016/0248474 A1 | 8/2016 | Gilson | |
| 2016/0343054 A1* | 11/2016 | Chu | G06Q 30/0627 |
| 2017/0024789 A1 | 1/2017 | Frehn et al. | |
| 2017/0026480 A1 | 1/2017 | Kim et al. | |
| 2017/0061349 A1 | 3/2017 | Zhang | |
| 2017/0206480 A1* | 7/2017 | Naumann | G06Q 10/06 |
| 2017/0217620 A1 | 8/2017 | Zeilstra | |
| 2017/0249581 A1* | 8/2017 | Hens | G06N 5/02 |
| 2017/0337512 A1 | 11/2017 | Saito | |
| 2018/0025487 A1* | 1/2018 | Macdonald | B07C 3/08 348/91 |
| 2018/0253680 A1* | 9/2018 | Jahani | G06Q 30/0633 |
| 2019/0362480 A1* | 11/2019 | Diao | G06T 7/10 |

FOREIGN PATENT DOCUMENTS

| | | |
|---|---|---|
| CN | 109840726 A | 5/2021 |
| JP | 2005-284996 | 10/2005 |
| JP | 2005-284996 A | 10/2005 |
| JP | 4333148 B2 | 9/2009 |
| JP | 2013-242793 A | 12/2013 |
| KR | 10-1572857 | 11/2015 |
| KR | 10-1572857 B1 | 11/2015 |
| TW | 201826217 A | 7/2018 |

OTHER PUBLICATIONS

International Search Report and Written Opinion in counterpart Application No. PCT/IB2020/057635 dated Nov. 17, 2020 (9 pages).
Notice of Preliminary Rejection mailed Nov. 27, 2020, from corresponding Korean Patent Application No. 10-2019-0126923 (16 pages).
Australian Examination Report in counterpart Australian Application No. 2020260571 dated Dec. 16, 2020 (5 pages).
Notice of Allowance, issued by the Korean Intellectual Property Office in counterpart Korean Application No. 10-2019-0126923 dated Apr. 5, 2021 (4 pages).
Office Action in counterpart Japanese Application No. 2020-570832, dated Nov. 2, 2021 (14 pages).
Office Action in counterpart Korean Application No. 10-2021-0088013, dated Dec. 27, 2021 (9 pages).
Hong Kong Examination Notice dated Sep. 27, 2021, in counterpart Application No. 22020013869.5 (7 pages).
Taiwanese Office Action in counterpart Taiwanese Patent Application No. 109127354 dated May 12, 2021 (21 pages).
Taiwanese Office Action in counterpart Taiwanese Application No. 109127354 dated Jan. 5, 2022 (22 pages).
Decision of Rejection in Japanese Application No. 2020-570832 dated Dec. 20, 2022 (16 pages).
Examination Notice in counterpart Hong Kong Application No. 22020013869.5 dated Aug. 23, 2022 (4 pages).
Office Action in counterpart Taiwanese Application No. 109127354 dated Sep. 27, 2022 (5 pages).
Office Action in counterpart Korean Application No. 10-2021-0088013 dated Jul. 21, 2022 (12 pages).
Office Action in counterpart Japanese Application No. 2020-570832 dated Apr. 26, 2022 (14 pages).
Written Opinion in Singaporean Application No. 11202012193U dated Nov. 21, 2024 (10 pages).

* cited by examiner

Favorites Application                                              login  Sign Up  Service center

[all]

My Account  Shopping Cart

Shipments  Fast Shipments  Christmas  Gold deals  Regular delivery  Events / Coupons  Planned Exhibition
                        Gift Cards Home > Food > Daily products / ice cream > Cheese > Fresh cheese > Mozzarella mozzarella cheese
285 Reviews   20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

FIG. 1C

SYSTEMS AND METHODS FOR SIMULATION OF PACKAGE CONFIGURATIONS FOR GENERATING COST OPTIMIZED CONFIGURATIONS

CROSS-REFERENCE TO RELATED APPLICATIONS

This application is a continuation of and claims the benefit of priority to U.S. application Ser. No. 16/579,432, filed Sep. 23, 2019 (allowed), the contents of which are hereby incorporated herein by reference.

TECHNICAL FIELD

The present disclosure generally relates to computerized systems and methods for optimization of types of packages used in packaging products. In particular, embodiments of the present disclosure relate to inventive and unconventional systems relate to optimizing packaging by maximizing the fill rate of a package type and minimization of costs involved with a certain type of package.

BACKGROUND

Determining the best set of packages is as important as predicting the type of product purchases in the future. Optimizing the set of packages aids in efficient packaging the purchased products and also store the least number of packages to be used in future. Current manual systems require human beings to guess which type and size of packages to order and store resulting in a lot of errors the guesswork. Even with computerized system, human being generally must manually input the package configuration preference parameters and types of packages and their availability and other additional data associated with each package.

These systems either underestimate to avoid unnecessary expenditure, resulting in overutilization of one or more types of boxes of smaller size or having a very low fill rate of boxes of larger size and ultimately causing more expenditure to package ad ship orders or overestimate and have too many types of packages with no utilization and incurring storage costs.

Therefore, there is a need for improved methods and systems for an automated and efficient package configuration identification system with the optimal type and count of packages to maximize utilization and minimize the cost.

SUMMARY

One aspect of the present disclosure is directed to a system for optimization of package configuration. The system includes at least one non-transitory storage medium comprising instructions and at least one processor executing the instructions for performing operations. The operations may include receiving historical order data associated with a fulfillment center, the order data including at least one of items ordered, package information, shipping costs, or fill rate, generating a forecast for order data based on the historical order data and performance data associated with the fulfillment center, the forecast comprising a plurality of dummy orders, receiving preferences for packaging cost reduction, determining a current packaging configuration associated with the fulfillment center, optimizing the current packaging configuration to generate at least one new packaging configuration using the received preferences and the generated forecast, and sending the at least one new packaging configuration to a remote system.

Another aspect of the present disclosure is directed to a method optimization of package configuration. The method comprising: receiving historical order data associated with a fulfillment center, the order data including at least one of items ordered, package information, shipping costs, or fill rate, generating a forecast for order data based on the historical order data and performance data associated with the fulfillment center, the forecast comprising a plurality of dummy orders, receiving preferences for packaging cost reduction, determining a current packaging configuration associated with the fulfillment center, optimizing the current packaging configuration to generate at least one new packaging configuration using the received preferences and the generated forecast, and sending the at least one new packaging configuration to a remote system.

Yet another aspect of the present disclosure is directed to a system for optimization of package configuration. The system includes at least one non-transitory storage medium comprising instructions and at least one processor executing the instructions for performing operations. The operations may include receiving historical order data associated with a fulfillment center, the order data including at least one of items ordered, package information, shipping costs, or fill rate, generating a forecast for order data based on the historical order data and performance data associated with the fulfillment center, the forecast comprising a plurality of dummy orders, receive preferences for packaging cost reduction for one or more groups of orders, determining a current packaging configuration associated with the fulfillment center and the one or more groups of orders linked to the received preferences, optimizing the current packaging configuration to generate at least one new packaging configuration using the received preferences and the generated forecast, and sending the at least one new packaging configuration associated with one or more groups of orders to a remote system.

Yet another aspect of the present disclosure is directed to a system for optimization of package configuration. The system includes at least one non-transitory storage medium comprising instructions and at least one processor executing the instructions for performing operations. The operations may include receiving historical order data associated with a fulfillment center, the order data including at least one of items ordered, package information, shipping costs, or fill rate, generating a forecast for order data based on the historical order data and performance data associated with the fulfillment center, the forecast comprising a plurality of dummy orders, receiving preferences for packaging cost reduction, determining a current packaging configuration associated with the fulfillment center, optimizing the current packaging configuration to generate at least one new packaging configuration using the received preferences and the generated forecast, and sending the at least one new packaging configuration to a remote system.

Other systems, methods, and computer-readable media are also discussed herein.

BRIEF DESCRIPTION OF THE DRAWINGS

FIG. 1C depicts a sample Single Display Page (SDP) that includes a product and information about the product along with interactive user interface elements, consistent with the disclosed embodiments.

DETAILED DESCRIPTION

Figure 1A:
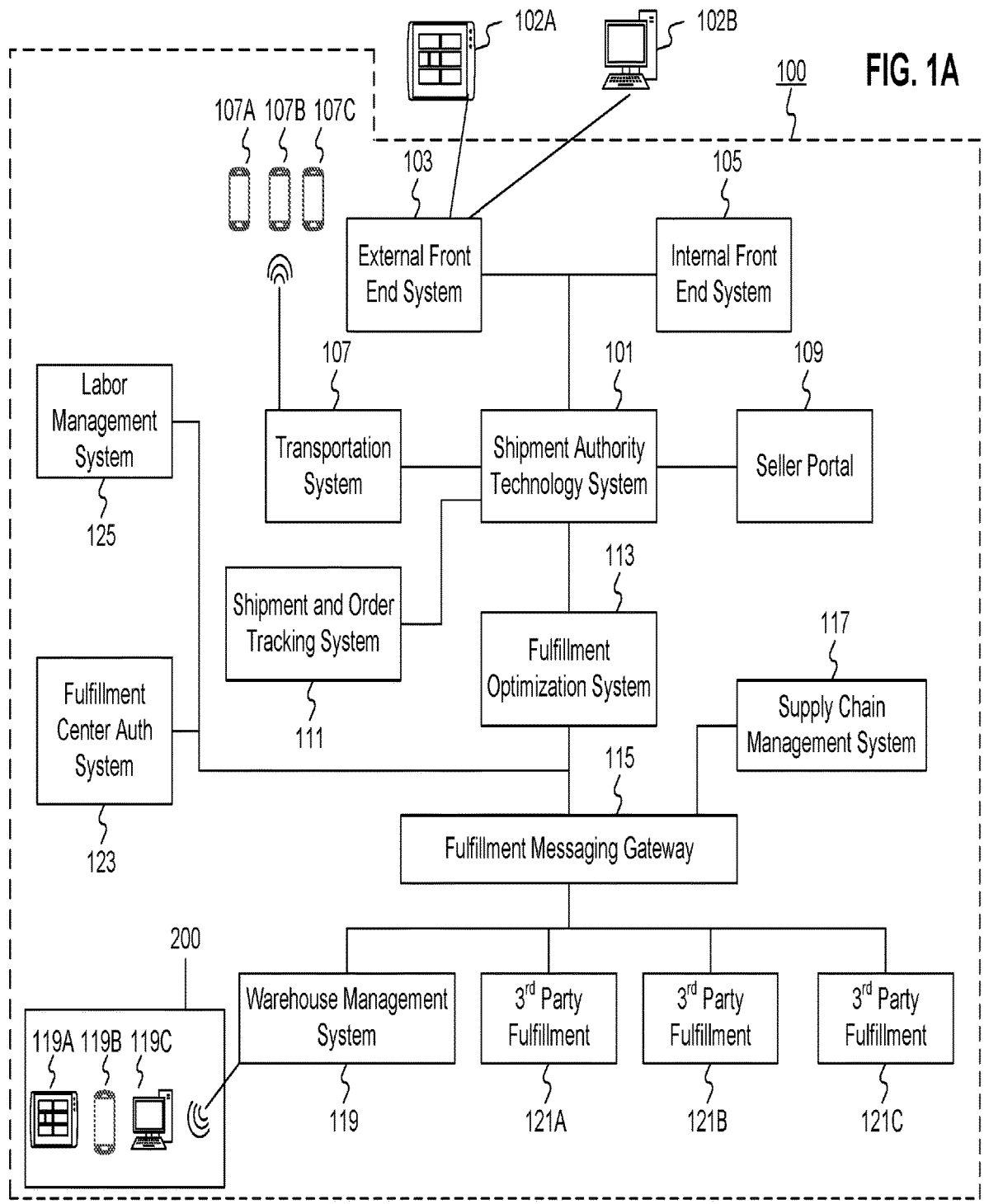
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for identification of package configuration for optimizing cost.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
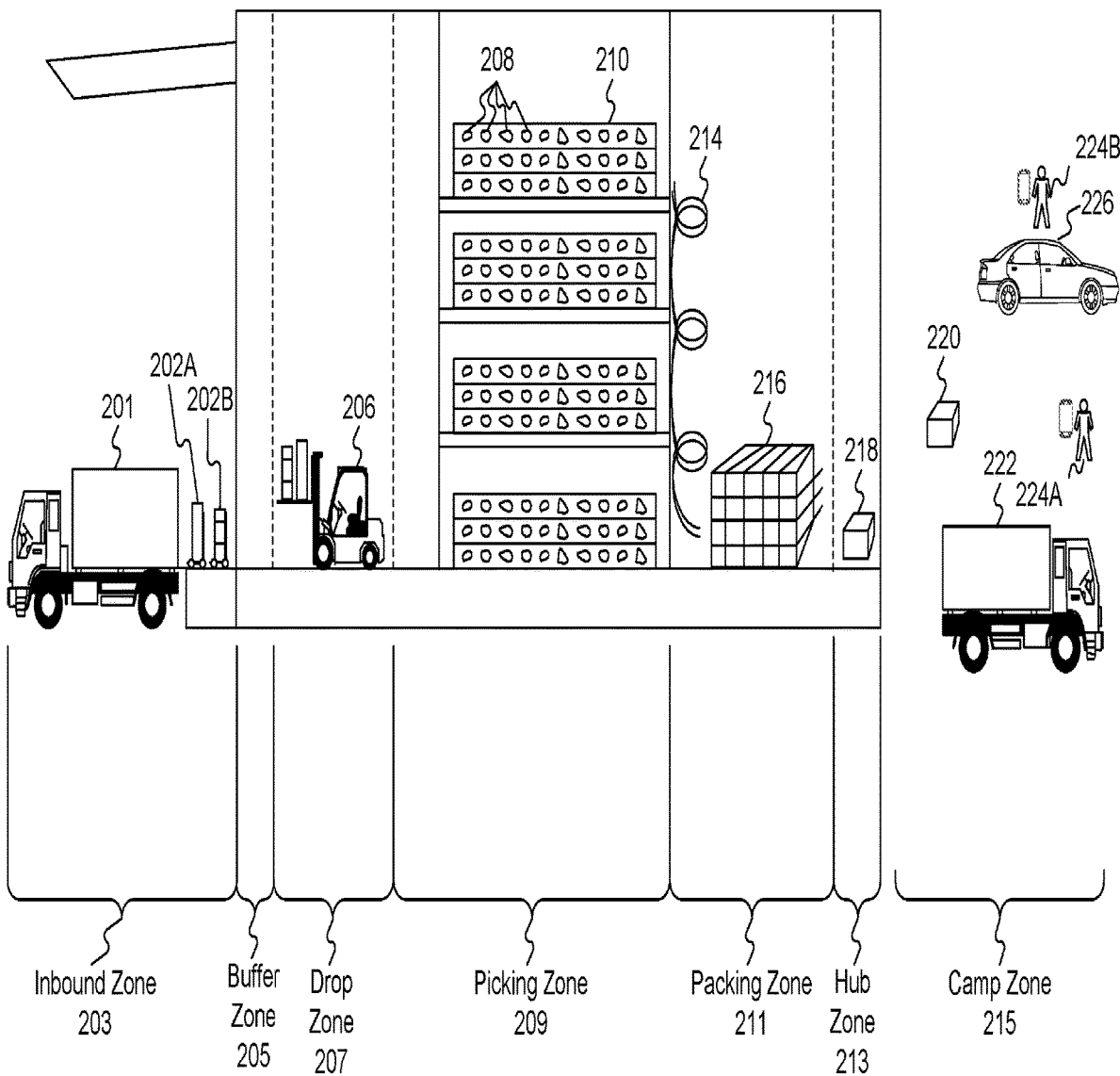
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119б.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
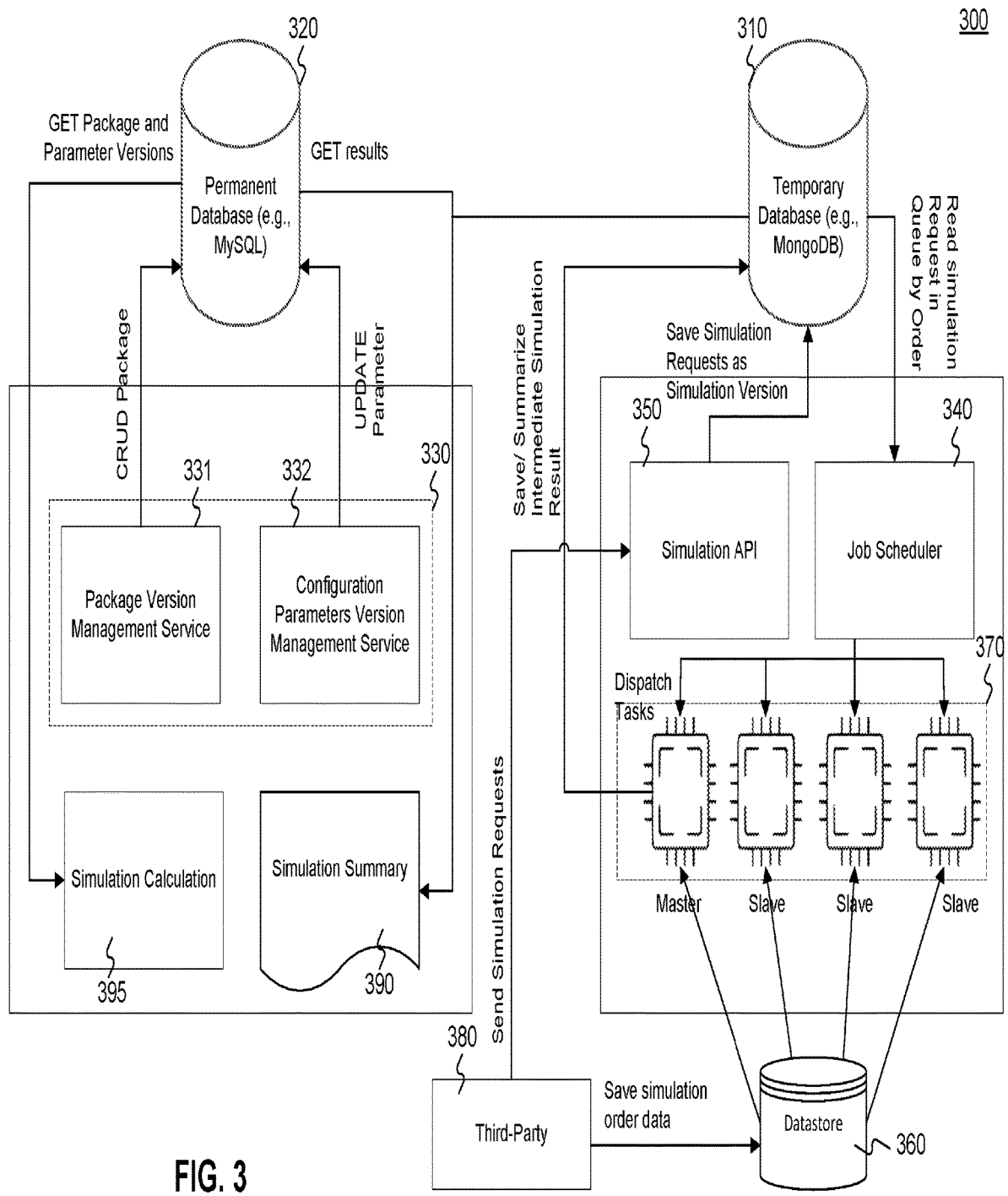
FIG. 3 is an exemplary package configuration optimization system, consistent with the disclosed embodiments.

FIG. 3 is an exemplary package configuration optimization system 300, consistent with the disclosed embodiments. Generation of a new package configuration may be triggered manually by employees of a fulfillment center 200 or automatically by the warehouse management system 119 whenever the packaging costs optimization falls below a certain threshold. Cost optimizations of packaging may include the fill rate of a certain type of package and the costs involved in utilization of that type of package (costs include manufacturing cost, storage cost, packing costs—i.e., amount of material that needs to be filled in the package, and shipping costs charged by a third party shipping service).

In some embodiments, fulfillment optimization system 113 may constantly monitor the cost optimization requirements and generate a trigger when threshold limits are no longer satisfied by the current configuration of packages.

Warehouse management system 119 can constantly listen for new configuration generation requests or requests are sent directly by the fulfillment optimization system 113 via fulfillment message gateway 115 for a certain fulfillment center 200.

The change in costs (shipping, storage, manufacturing) could result in the failure to satisfy cost optimization threshold limits of a package configuration. Supply chain management system 117 can provide these details to both fulfillment optimization system 113 to determine failure to meet the user expected thresholds and/or warehouse management system 119 to generate a new package configuration of optimized costs. Supply chain management system 117 may also identify changes to the availability of packages of package configuration to indicate that there is a requirement for generation of a new package configuration. Package configuration can also occur due to availability/unavailability of certain types of packages. In such scenarios, supply chain management system 117 may communicate with warehouse management system 119 directly to generate a new package configuration. In some embodiments warehouse management system 119 may maintain multiple package configurations for different scenarios (e.g., seasons/weather, availability, types of products, etc.).

Package configuration optimization system (PCOS) 300 may maintain multiple versions of the package configurations and their associated costs in a database. PCOS 300 may simulate orders to determine one or more viable package configurations relevant in certain circumstances. New configurations and the associated simulated orders may also be stored in the database. The exemplary PCOS 300 comprises two database systems to store temporary results and permanent results. As shown in FIG. 3, in some embodiments the temporary results are stored in a key-value pair temporary database (e.g., MongoDB) 310 and the permanent results are stored in a permanent (relational) database (e.g., MySQL) 320.

The permanent results include various versions of package and configurations details. PCOS 300 may include version management tools 330 for both managing package versions using package version management service 331 and configuration parameters version management service 332. Both package version management service 331 and configuration parameters version management service 332 may be accessible through internal frontend system 105. Employees of a fulfillment center 200 can access them through devices 119A-C. Package service 331 can allow CRUD (Create, Read, Update, and Delete) operations on the details of various types of packages. Package details may include the type of package (Cardboard box, Plastic bag, Styrofoam box), dimensions of the package, cost of manufacturing the package. Config service 332 may allow only update operations to change the config details. Config details maybe parameters which determine the cost optimization thresholds including minimum allowed fill rate, maximum allowed costs for storage and shipping of packages.

Third-party system 380 can send one or more simulation requests to the PCOS 300 to generate new package configurations. In some embodiments, third party 380 may be employees of fulfillment center 200 entering simulation requests through devices 119A-C. Simulation requests from third party 380 may be sent directly or indirectly to PCOS 300. In some embodiments, the simulation results are sent by third party 380 to the first-party warehouse management system 119 to make indirect simulation requests. Third-party 380 can also be other software/computing systems, such as fulfillment optimization system 113 and supply chain management system 117, generating simulation requests for generation of package configurations.

As shown in FIG. 3, third party 380 simulation requests can result in calls sent to simulation API 350. Simulation API 350 may save the new simulation requests in the temporary database 310 prior to scheduling a simulation. PCOS 300 may save the new simulation requests until the past requested simulations are completed by computing system 370. PCOS 300 can also include a job scheduler 340 which schedules the simulation requests and manages the dispatch of various tasks to the computing system 370. Job schedule 340 may make read requests for new simulations requests from temporary database 310 upon availability of one more processor of the computing system 370. As shown in FIG. 3, computing system 370 may have a master-slave configuration. Each slave may execute a different task of the simulation request. Each Task may include a new simulation request or optimization of a configuration parameter.

Computing system 370 may access data store 360 containing historical orders. Computing system 370 may generate simulated orders based on historical orders. In some embodiments, computing system 370 may read simulated orders generated for simulation purpose to use with a new simulation request from the data store 360. Datastore 360 may be a data lake of unlimited capacity storing all possible past orders to help generate simulated orders of specific time range or type of orders.

In some embodiments, each simulation request stored in temporary database 310 is associated with a simulated set of orders in data store 360. Third-party 380 may generate both simulation requests and simulated orders simultaneously and attach a unique identifier (UUID) with both for association. In some embodiments, a single set of simulated orders may be associated with the multiple simulation requests. Such one-to-many associations may be used to determine which package configuration is the most optimized configuration for packaging the same set of simulated orders.

In some other embodiments, a data store 360 may supply one or more past orders to a computing system 370 to forecast potential future orders to understand the impact on a current package configuration. Third-party 380 may request a remote simulation system to generate simulated future orders based on the historical order data. Forecasting future orders may be performed using one or more machine learning models. Computing system 370 on completion of a simulation may share the result in temporary database 310. In some embodiments, computing system 370 may generate intermediate simulation results and store them in temporary database 310. The intermediate results may be one or more package configurations satisfying the cost optimization requirements set via configuration parameters. Computing system 370 may identify the best package configuration among the identified package configuration satisfying the cost optimization requirements. Computing system 380 may then direct the temporary database 310 to send the final result of a simulation to be saved as a simulation summary 390 in permanent database 320. In some embodiments, the intermediate simulation results in temporary database 310 may be reutilized to generate improved results via a recursive process. In some embodiments, simulation calculation tool 395 may identify the best package configuration among the available configurations in package version management service 331 and selected parameters from configuration parameters version management service 332.

Figure 4:
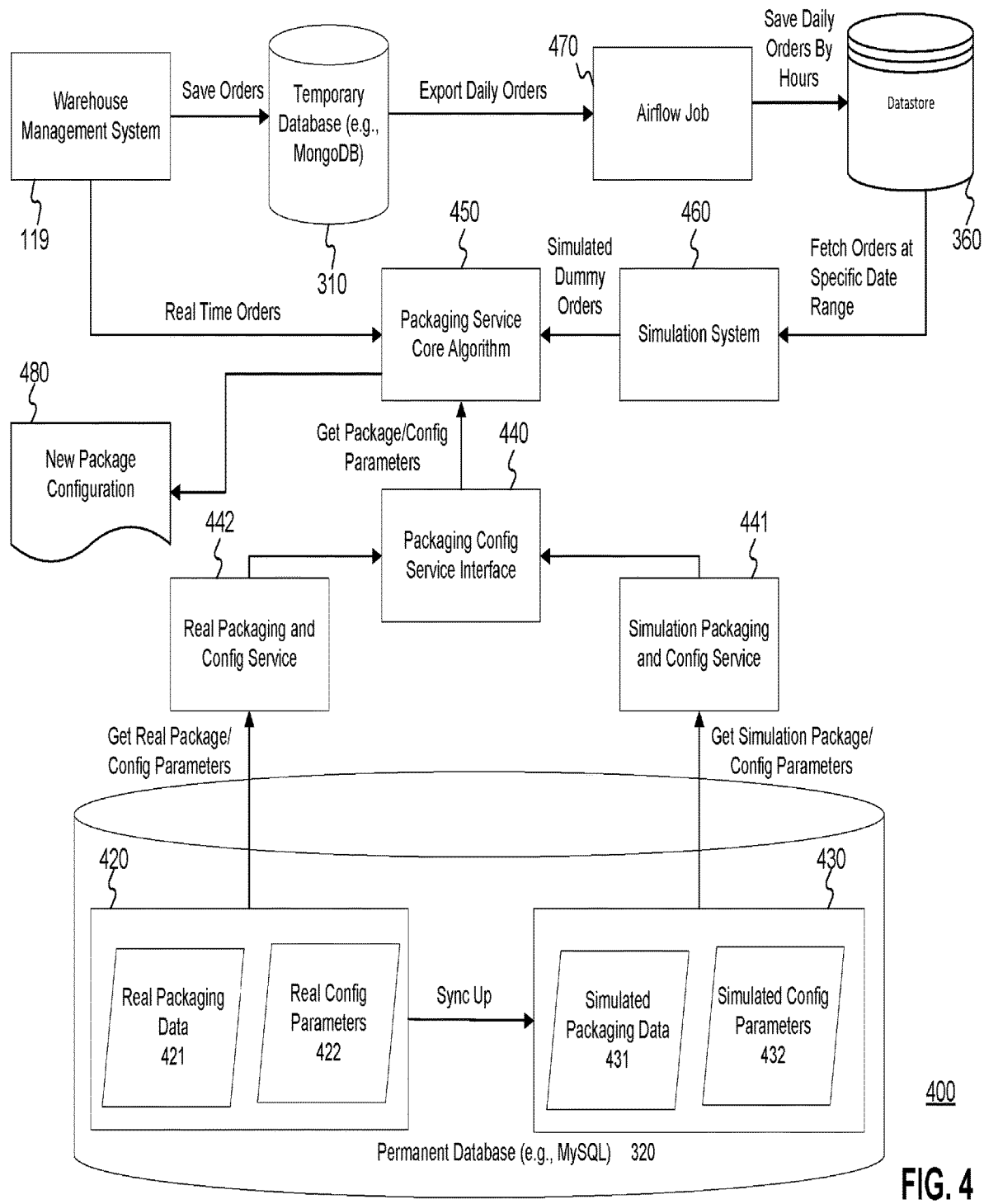
FIG. 4 is an illustrative flow diagram of simulation requests for generating new package configurations, consistent with the disclosed embodiments.

FIG. 4 is an illustrative flow diagram 400 of simulation requests for generating new package configurations, consistent with the disclosed embodiments. The flow diagram 400 shows an interaction between various components of the PCOS system 300 to generate the optimized package configuration based on input preferences and various currently available package configurations.

Generating a new package configuration requires both a set of simulated dummy orders and packaging information including details about different types of packages and preferences for a package configuration. Packaging service core algorithm 450 can ingest these two inputs to generate the optimized new package configuration 480 that meets the preference for package configuration included in config parameters 332 and config parameters 432. Packaging service core algorithm 450 begins by first determining the efficient packaging of products ordered in each simulated order. Efficient packaging may include the least number of packages utilized in packing the ordered products in a single order or the compact space used in packing the ordered products or both. The compact space includes the total volume of the one or more packages used in packing ordered products. In some embodiments, packaging service core algorithm 450 may consider the amount of unused space after packing an order. Packaging service core algorithm 450 may consider all available packages for purchase to determine the most efficient packing. The identified packages for packaging may only include the ones used to pack the same products in past orders. In some embodiments, the packages used for packing products in past orders may be considered to be "efficient" packages and may be included in the set of determined packages.

After identifying the packages to be used for efficient packaging of the simulated orders, packaging service core algorithm 450 may perform a clustering analysis to determine clusters of closely related packages. The clusters may be between individual packages or sets of packages chosen to pack the simulated ordered products efficiently. For example, a K-means clustering technique may be used to determine the cluster of packages. The "K" chosen could be the maximum number of packages to use per order or the max number of package types to purchase. K could be inputted as a config parameter in config parameters 342 or config parameters 432. The K-means technique may be used to generate an optimized set of packages to purchase in order to pack the ordered products. The technique may begin by randomly choosing K set of packages from the set of packages to pack the simulated orders efficiently and identify the unused space in each type of package. Packaging service core algorithm 450 may utilize the K-means clustering technique may be iteratively executed until a minimal sum of the variances (e.g., mean unused space across orders) is identified.

Warehouse management system 119 helps generate simulated orders by first saving the generated orders to the temporary database 310. In some embodiments, a third-party 380 (shown in FIG. 3) may have requested the warehouse management system 119 to save the orders to a temporary database 310. In some other embodiments, orders may be stored in data store 360 and may be accessed by a simulation system 460. Orders are exported by PCOS 300 to the data store 360 using a workflow management tool/library (e.g., Airflow, Oozie, Luigi). In exemplary flow diagram 400, Airflow job 470 helps export the orders from temporary database 310 to data store 360. The airflow job 470 may store the orders grouped in different forms, for example by hour and day.

The simulation system 460 may include a job scheduler 340 and simulation API 350 and generate simulated orders based on the historical orders stored in data store 360. The job scheduler may be the same workflow management tool/library used to generate the Airflow job 470. The simulated system 460 may store the simulated orders in data store 360 to use with various package configurations to identify the best package configuration. In some embodiments, a version label may be associated with the simulated orders. The same historical orders may be used to generate multiple versions of simulated orders. For example, the same set of historical clothing orders may be used to generate simulated orders during a flash sale and with no discounts. Such various versions of simulated orders may help generate the appropriate package configurations. The simulated dummy orders are supplied as one of the inputs to the packaging service core algorithm 450.

Packaging config service interface provides the second input of package and config details to the packaging service core algorithm 450. The package config service interface 440 may be an API to access the stored versions and package and config details in a permanent database 320. In some embodiments, packaging config service interface 440 may, in turn, call separate services to access simulated package and config details and real packaging and config details. The separation of services may be to determine if some system is a production system with access to real package ad config details or a testing or development system with access to simulated package and config details. The separation of services may be due to different access and authorization requirements of two different sets of data. In the exemplary embodiment 400, package config service interface 440 accesses real data 420 through real packaging and config service 442 and access simulated data 430 through simulation packaging and config service. Both simulated and real services 441 and 442 may also act as version management tools 330 to mange multiple versions of the package configurations and configuration parameters used to determine. For example, multiple versions may be saved and retrieved in future when similar forecast of orders is expected by a fulfillment center 200. In some embodiments, the previous versions may be used in learning to better predict future package configurations.

PCOS 300 (described above with respect to FIG. 3) may at regular intervals sync real data 420 and simulated data 430. Sync up includes adding new costs of packages in real package data to simulated package data 431 to help identify accurately cost-optimized package configurations. In some embodiments, simulated data 430 may include additional data absent in real data 420.

Package service core algorithm 450 may generate as output a new package configuration 480. In some embodiments, new package configuration 480 may be a set of package configurations which satisfy the optimization requirements of config parameters 422 and/or 432. The new package configuration 480 may be shared with a simulation calculation tool 395 (described above with respect to FIG. 3) to select the best package configuration.

Figure 5:
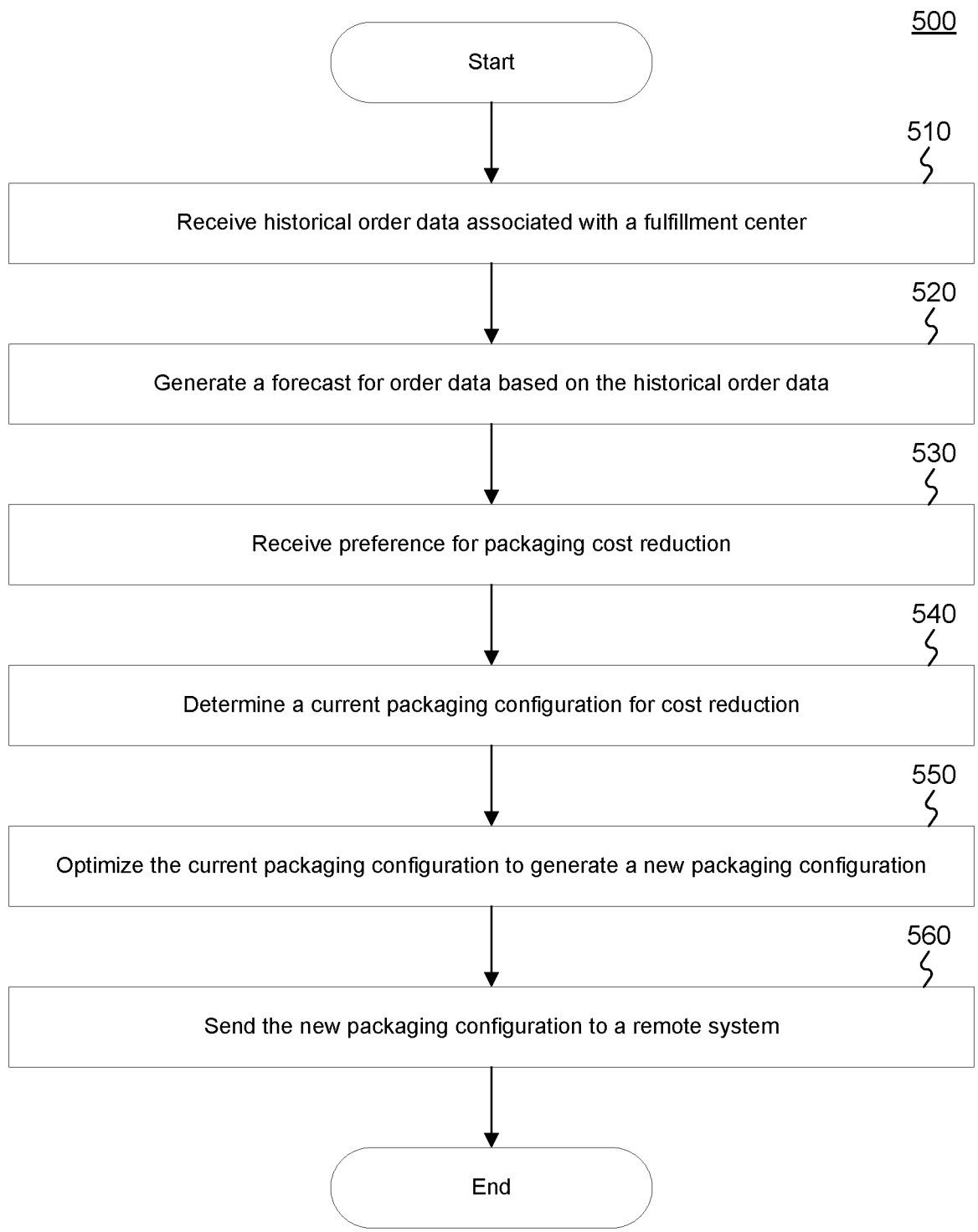
FIG. 5 is an illustrative flowchart of a method for identifying optimized package configuration to package efficiently ordered products, consistent with the disclosed embodiments.

FIG. 5 is an illustrative flowchart of a method for identifying optimized package configuration to package efficiently ordered products, consistent with the disclosed embodiments. The steps of method 500 may be performed by the PCOS 300; in some embodiments, other systems or devices may perform one or more steps of method 500. It will be appreciated that the illustrated method can be altered to modify the order of steps, further include additional steps.

In Step 510, PCOS 300 may receive a set of historical orders. The historical orders may be associated with a fulfillment center 200 and may be accessed from a database storing the orders. The historical orders may be pre-organized in groups by type, fulfillment center and/or by the hour/date. The PCOS 300 may request a set of historical orders in a certain date range or request orders for the same days of the week over a period of time (e.g., each Wednesday).

In Step 520, PCOS 300 may generate a forecast for order data based on the historical data. The forecast may comprise one or more dummy orders. In some embodiments, PCOS 300 may delegate simulation of dummy orders to a simulation system 460. The dummy orders may be generated based on the trend of historical orders. The simulation system 460 may consider order data across same dates across multiple years and machine learning models to generate a set of simulated orders. Unlike the real orders the simulated orders may be executed at a much faster pace. In order to handle such sudden rush of orders a special computing system 380 may be employed by PCOS 300.

In Step 530, PCOS 300 may receive preferences for packaging cost reduction. The preferences may include types of packaging, sizes of packaging, and proportion of packaging. The sizes of packaging and types of packaging information may be based on availability of various types of packages as offered by supply chain management system 117. Supply chain management system 117 may supply these preferences based on the future availability of various types and sizes of packages. The future availability predictions themselves may be made based on execution of historical order data. In some embodiments, a supply chain management system 117 along with fulfillment optimization system 113 may determine the number of simulated order product kinds that may be packaged in various types/sizes of available packages to determine the proportion of the total packages a single type of package may be allowed without disrupting the cost reduction. The proportion may include both a maximum and minimum proportion.

In Step 540, PCOS 300 may determine a current packaging configuration eligible for cost reduction. The packaging configuration available for cost reduction may include the overall set of packages needed to package all the orders. In some other embodiments, a new configuration may be introduced rather than updating one of the current configurations. A particular package configuration may be associated with a group of orders. The grouping of orders may occur based on the type of shipment, distance of shipment, and type of ordered products, etc.

In Step 550, PCOS 300 optimizes the current packaging confirmation to generate a new packaging configuration. PCOS 300 generates the new configuration based on the historical order data and/or the simulated orders generated from the historical data and the preferences for packaging cost reductions supplied in Step 530. The optimization includes a balance between maximizing fill rate of each type/size of the package and the minimization of the overall costs. A package configuration may be considered optimized based on the meeting of certain thresholds for costs and/or fill rate. Packaging service core algorithm 450 (in FIG. 4) may be used for optimization of package configuration to be chosen. The overall costs may include the costs to manufacture a certain package and the costs to store it in a fulfillment center 200 and the cost to use it in shipping as charged by a third party shipping service.

In Step 560, the PCOS 300 may send the generated new packaging configuration to a remote system. Prior to sending the new package configuration may select from a series of identified new package configurations. The determination of the best package configuration may also depend on the preferences stored in the form of config parameters 422 and 432. For example, one of the parameters may recommend giving higher weight to shipping costs, thus picking the configuration with the lowest shipping costs.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for packaging optimization, comprising:
   at least one processor; and
   at least one non-transitory storage medium comprising instructions that, when executed by the at least one processor, cause the at least one processor to perform steps comprising:
      in response to detecting that one or more optimization parameters do not satisfy one or more predetermined threshold limits, generating a forecast including one or more simulated orders based on historical order data associated with a fulfillment center, wherein the forecast is generated based on a machine learning model;
      determining a current packaging configuration associated with the fulfillment center; and optimizing the current packaging configuration to generate at least one optimized packaging configuration based on the simulated orders.

2. The system of claim 1, the steps further comprising:
receiving preferences for packaging cost reduction, the preferences including one or more of a type of packaging, a size of packaging, or a proportion of packaging.

3. The system of claim 1, wherein the historical order data includes one or more of items ordered, package information, shipping costs, or fill rate.

4. The system of claim 1, wherein optimizing the current packaging configuration further comprises:
optimizing the packaging configuration over at least one of packaging cost or packaging fill rate, wherein:
packaging cost comprises at least one of storage cost, shipping cost, or purchase cost.

5. The system of claim 4, wherein optimizing the current packaging configuration further comprises iteratively modifying a plurality of package sizes and a number of units for each of the plurality of package sizes to maximize fill rate.

6. The system of claim 1, wherein each of the optimized packaging configurations comprises:
a plurality of package sizes;
a number of units for each of the plurality of package sizes; and
estimated fill rates for each package of each package size.

7. The system of claim 1, the steps further comprising:
determining a best packaging configuration from the optimized packaging configurations; and
sending the best packaging configuration to a remote system.

8. The system of claim 7, wherein the remote system comprises a packaging ordering system.

9. The system of claim 7, wherein determining the best packaging configuration is based on a scenario including at least one of seasonality, availability, or type of products stored in the fulfillment center.

10. The system of claim 1, wherein the packaging configuration includes an overall set of packages needed to package all the one or more simulated orders.

11. A computerized implemented method for packaging optimization, the method comprising:
in response to detecting that one or more optimization parameters do not satisfy one or more predetermined threshold limits, generating a forecast including one or more simulated orders based on historical order data associated with a fulfillment center, wherein the forecast is generated based on a machine learning model;
determining a current packaging configuration associated with the fulfillment center; and
optimizing the current packaging configuration to generate at least one optimized packaging configuration based on the simulated orders.

12. The method of claim 11, further comprising:
receiving preferences for packaging cost reduction, the preferences including one or more of a type of packaging, a size of packaging, or a proportion of packaging.

13. The method of claim 11, wherein the historical order data includes one or more of items ordered, package information, shipping costs, or fill rate.

14. The method of claim 11, wherein optimizing the current packaging configuration further comprises:
optimizing the packaging configuration over at least one of packaging cost or packaging fill rate, wherein:
packaging cost comprises at least one of storage cost, shipping cost, or purchase cost.

15. The method of claim 14, wherein optimizing the current packaging configuration further comprises iteratively modifying a plurality of package sizes and a number of units for each of the plurality of package sizes to maximize fill rate.

16. The method of claim 11, wherein each of the optimized packaging configurations comprises:
a plurality of package sizes;
a number of units for each of the plurality of package sizes; and
estimated fill rates for each package of each package size.

17. The method of claim 11, further comprising:
determining a best packaging configuration from the optimized packaging configurations; and
sending the best packaging configuration to a remote system.

18. The method of claim 17, wherein the remote system comprises a packaging ordering system.

19. The method of claim 17, wherein determining the best packaging configuration is based on a scenario including at least one of seasonality, availability, or type of products stored in the fulfillment center.

20. The method of claim 11, wherein the packaging configuration includes an overall set of packages needed to package all the one or more simulated orders.

* * * * *